(12) United States Patent
Mostazo-Oviedo

(10) Patent No.: US 7,510,361 B2
(45) Date of Patent: Mar. 31, 2009

(54) DOWEL

(75) Inventor: José Antonio Mostazo-Oviedo, Barcelona (ES)

(73) Assignee: Unex Aparellaje Electrico S.L., Barcelona (ES)

( * ) Notice: Subject to any disclaimer, the term of this patent is extended or adjusted under 35 U.S.C. 154(b) by 64 days.

(21) Appl. No.: 11/485,423

(22) Filed: Jul. 13, 2006

(65) Prior Publication Data
US 2007/0020064 A1    Jan. 25, 2007

(30) Foreign Application Priority Data
Jul. 22, 2005    (ES)    ............................. 200501693 U

(51) Int. Cl.
*F16B 19/00*    (2006.01)
(52) U.S. Cl. ..................................... 411/510
(58) Field of Classification Search ......... 411/508–510, 411/913, 455, 400, 401; 24/457, 458, 289, 24/297; 248/74, 3
See application file for complete search history.

(56) References Cited

U.S. PATENT DOCUMENTS

| | | | | |
|---|---|---|---|---|
| 3,252,677 A * | 5/1966 | Raymond | ................. | 248/68.1 |
| 3,483,787 A * | 12/1969 | Saunders | ................. | 411/510 |
| 3,867,864 A * | 2/1975 | Knohl | ................. | 411/455 |
| 3,966,339 A * | 6/1976 | Nemecek et al. | ............ | 403/292 |
| 4,834,127 A * | 5/1989 | Van Sice | ................. | 135/76 |
| 4,902,182 A * | 2/1990 | Lewis | ................. | 411/510 |
| 5,131,613 A * | 7/1992 | Kamiya et al. | ............ | 248/74.3 |
| 5,496,141 A * | 3/1996 | Popsys | ................. | 411/510 |
| 5,772,551 A * | 6/1998 | Mabie | ................. | 474/256 |
| 5,921,510 A * | 7/1999 | Benoit et al. | ................. | 248/71 |
| 6,398,473 B1 * | 6/2002 | Kraus | ................. | 411/508 |
| 6,520,704 B1 * | 2/2003 | Vidmar et al. | ............. | 403/188 |
| 6,536,718 B2 * | 3/2003 | Benito-Navazo | ............ | 248/71 |

* cited by examiner

*Primary Examiner*—Flemming Saether
(74) *Attorney, Agent, or Firm*—Staas & Halsey LLP

(57) ABSTRACT

A dowel inserted under pressure in a hole, including a head and a body which remain outside and inside the hole, respectively. The head is suitable for a clamp to pass through. The body includes a central core from which there emerge annular retention tabs having a slightly larger diameter than the hole, all provided with radial notches, and a centring annular projection. Each annular retention tab forms a pair with an annular abutment tab located, with respect to the former, in the position nearest the head. The annular abutment tab has a diameter that is smaller than that of annular retention tab and equal to that of the hole.

16 Claims, 3 Drawing Sheets

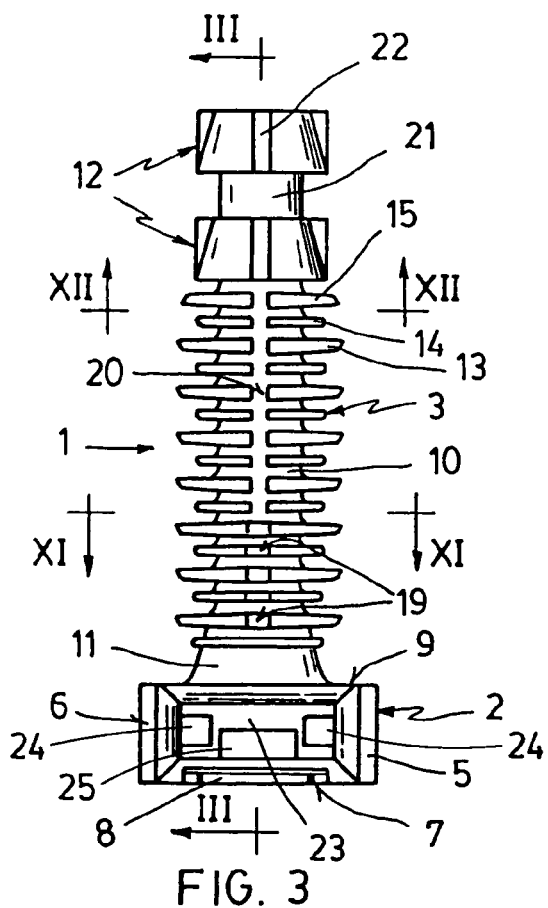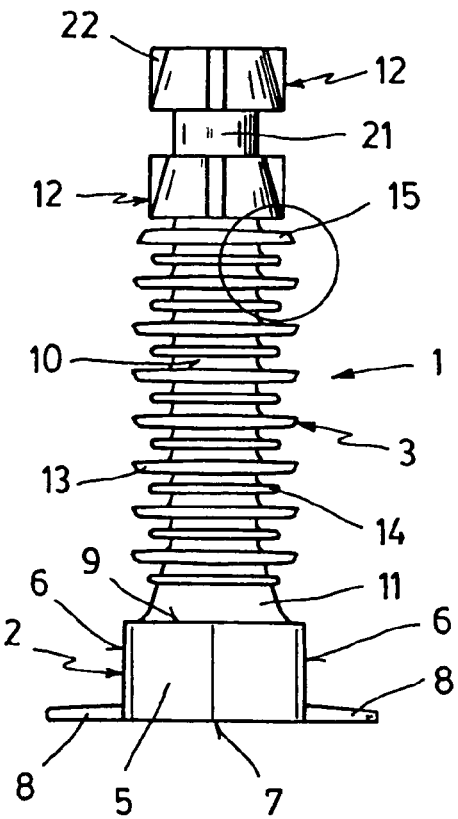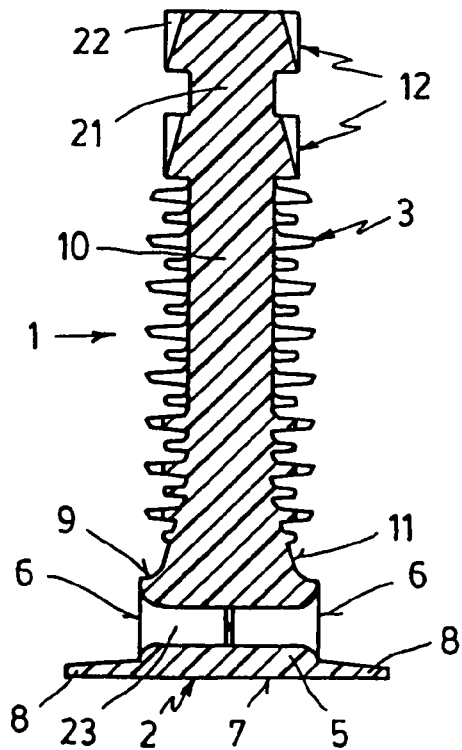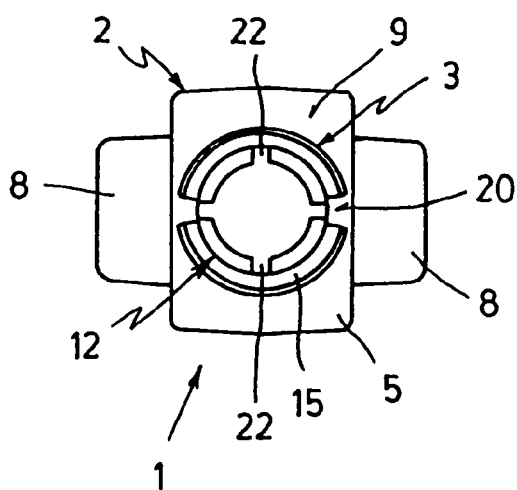

FIG. 5
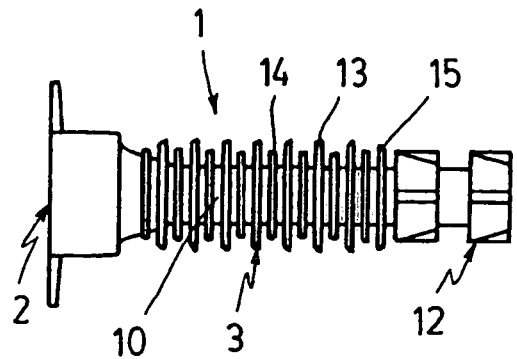
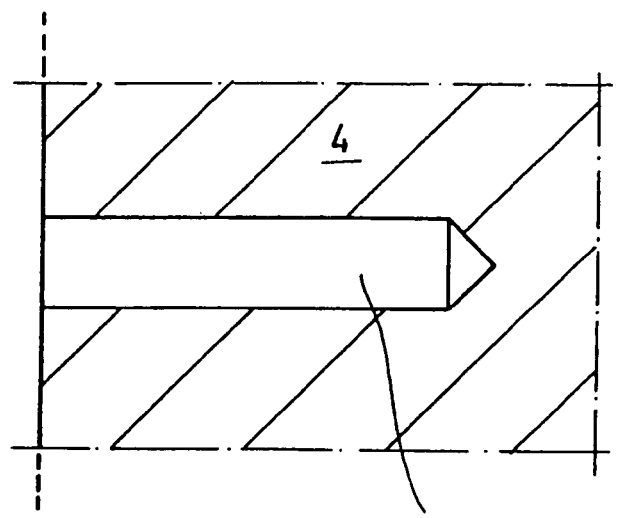
FIG. 6
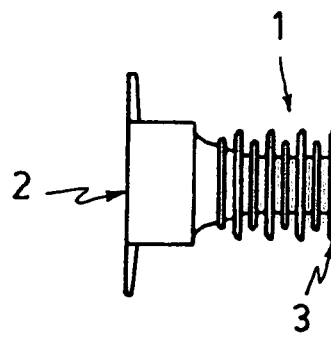
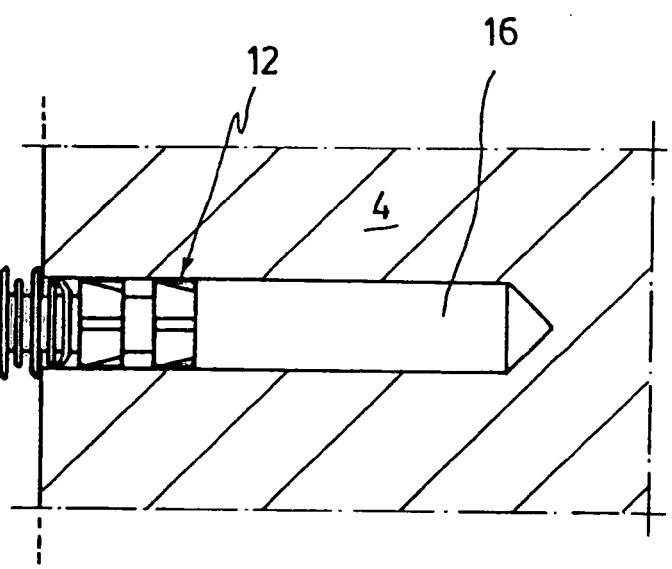
FIG. 8
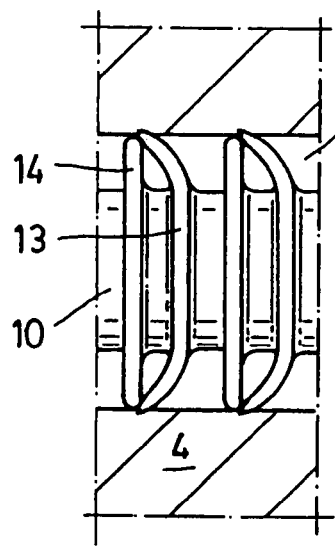
FIG. 7
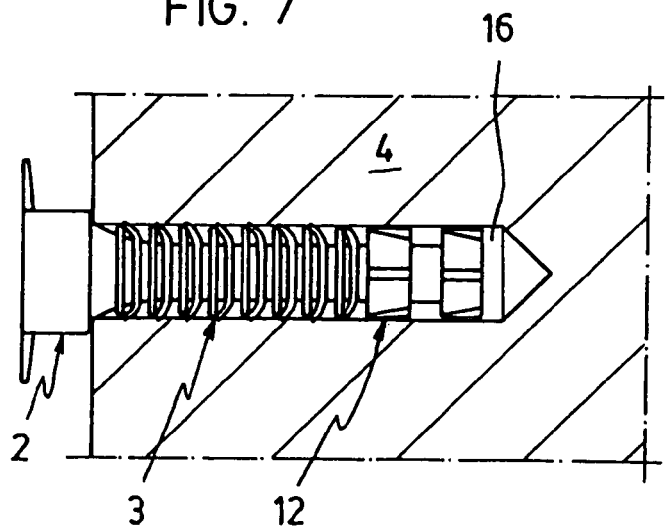

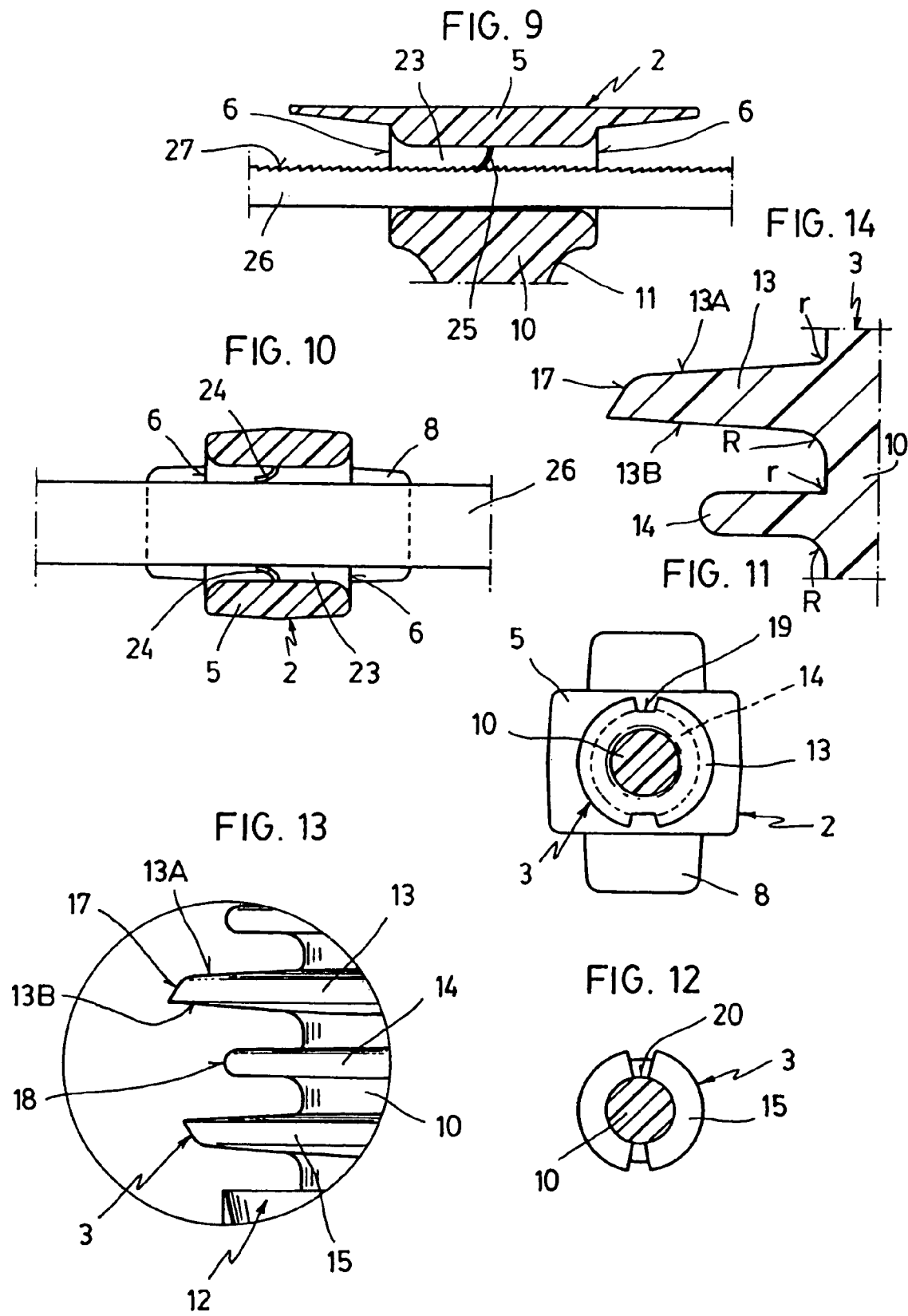

DOWEL

FIELD OF THE INVENTION

This invention relates to an improved dowel of the type used in construction, industry and interior decoration to be inserted under pressure in an insertion hole in inside walls, outside walls, facings and the like.

The type of dowel to which the invention relates consists in an integral piece of synthetic material made up of a head intended to remain in position outside the insertion hole, said head being suitable for a clamp to pass through and for absorbing the impacts from the force applied to oblige the dowel under pressure into the insertion hole, and a body intended to remain in position inside the insertion hole, said body comprising a central core from which there emerge, in the orthogonal direction, a series of annular retention tabs having a slightly larger diameter than that of the insertion hole and at least one centring annular projection at the end of the central core opposite the dowel head, said centring annular projection having a diameter that coincides with that of the insertion hole and being intended to direct the dowel into the insertion hole, said annular retention tabs having radial notches of a greater or lesser depth that modify their rigidity.

BACKGROUND ART

The dowels of the referenced type have some drawbacks that can be improved in various aspects, such as the increase in the degree to which the dowel is packed into the insertion hole in the inside wall, outside wall or facing; ensuring, at the time of insertion, the position and centring of the clamp in the dowel head before laying any cables, bundle of cables or conduit; ensuring the direction of the dowel in the insertion hole prior to inserting said dowel into the inside wall, outside wall or facing; increasing the versatility of the dowel so that just one single model for each diameter in the dowel range can be used indistinctively in solid brick or hollow inside walls or outside walls; the degree of flexibility of the annular retention tabs; and the subsequent adoption of the cylindrical configuration for the central core.

SUMMARY DISCLOSURE OF THE INVENTION

In order to improve the indicated aspects, various solutions have been adopted which, overall, constitute the object of the invention, without, however, said solutions losing their independently considered inventive step. In order to limit the flexing of the annular retention tabs and increase their packaging or compactness in the insertion hole, the solution has been adopted to incorporate auxiliary elements that reinforce the position of said annular retention tabs. Moreover, the length of the dowel body has been increased and it has been shaped so that the dowel length can be adjusted according to practical S requirements. In order to ensure that the clamp is retained and centred when it is inserted into the dowel head, and maintained in such a position until it is fastened around a cable, a bundle of cables or a conduit, retention and centring means have been provided inside the passage hole arranged in the dowel head to pass the clamp through.

The dowel according to the invention is characterised in that each of said annular retention tabs forms a pair with a similar annular abutment tab located, with respect to the annular retention tab with which it forms the pair, in the position nearest the dowel head, said annular abutment tab having a diameter that is smaller than that of said annular retention tab and which coincides with that of the insertion hole.

Preferably, the edge of the annular retention tabs is bevelled through its full thickness, so that for each annular retention tab there is defined a smaller face orientated towards the dowel head and a larger face orientated towards the tail of said dowel.

Preferably, the edge of the annular abutment tabs is blunt, at least in the half facing the annular retention tab with which it forms a pair.

Preferably, the annular retention tabs and the annular abutment tabs located in an axial part of the dowel body next to the head have partial radial notches the bottom of which is separated, the same distance, from the central core, while in the rest of said dowel body the annular retention tabs and the annular abutment tabs have complete radial notches which reach as far as said central core.

Preferably, said partial radial notches and said complete radial notches of the annular retention tabs and the annular abutment tabs are aligned parallel to the axis of the central core.

Preferably, each of said annular retention tabs and said annular abutment tabs has only two of said radial notches arranged in diametrically opposite positions with respect to the axis of the central core.

Preferably, the difference in diameters and the distance between each annular retention tab and the annular abutment tab with which it forms a pair are such that said annular retention tab can flex and rest on said annular abutment tab and on the wall of the insertion hole.

Preferably, the annular retention tabs, on the smaller face orientated towards the dowel head, and the annular abutment tabs, on their face orientated in the same way, connect to the central core according to a reduced radius arc, whereas on the larger face orientated towards the tail of the dowel, the annular retention tabs and the annular abutment tabs connect with the central core according to a larger radius than said reduced radius.

Preferably, said annular centring projection is made up of at least one frustoconical body, arranged on the tail of the dowel opposite the head and as an axial continuation of the central core, and it is joined coaxially to said central core by its larger base and has bracketed tabs on a virtual cylindrical surface which has a slightly greater diameter than said larger base of the frustoconical body, which has a diameter that coincides with that of the insertion hole.

Preferably, the tail of the dowel body has two of said frustoconical bodies separated from each other by a section intended to allow the separation of the frustoconical body located nearest to the dowel end opposite the head.

Preferably, the dowel head has a window made up of a through hole which is orthogonal to the axis of the central core and has an elongated quadrangular section, two centring tongues and one retention tongue being arranged inside said through hole, all placed transverse to said through hole, said centring tongues being located opposite one another on opposite faces of said through hole and said retention tongue being arranged on the face of said through hole furthest away from the central core of the dowel.

Preferably, the first of said retention tabs, that is the one furthest away from the dowel head, has a diameter that is smaller than the diameter of the rest of said annular retention tabs and greater than the diameter of the insertion hole.

Preferably, said first annular retention tab has its edge bevelled thereby defining a larger annular face orientated towards the dowel head and a smaller annular face orientated towards the end opposite the dowel head.

BRIEF DESCRIPTION OF THE DRAWINGS

In order to facilitate the understanding of the preceding ideas, an embodiment of the dowel of the invention is described below, including all the improvements of the invention without excluding, however, a partial inclusion thereof.

The description relates to the accompanying illustrative drawings, in which:

FIG. 1 is an elevation view of the dowel of the invention, with the window in the dowel head located at the front.

FIG. 2 is an elevation view of the dowel of the above figure, rotated through 90°, with the side of the dowel head located at the front.

FIG. 3 is a sectional view along line III-III of FIG. 1.

FIG. 4 is a plane view of FIG. 2, showing in the foreground the tail of the dowel and in the background, the head thereof.

FIG. 5 is a side elevation view of the dowel of the invention aligned with an insertion hole shown in section, prior to inserting the dowel in the insertion hole.

FIG. 6 is, similar to the preceding figure, a view of the dowel being directed into the insertion hole, prior to inserting said dowel, which shows the flexing of the first annular retention tab and the adjustment of the end frustoconical bodies in the insertion hole.

FIG. 7 shows the dowel inserted into the hole, in a final stage following that illustrated in the preceding figure, particularly showing the positioning of the annular retention tabs and the annular abutment tabs once they are all located inside the insertion hole.

FIG. 8 is an enlarged detail of FIG. 7 showing the configuration that the annular retention tabs adopt in relation to the insertion hole and the annular abutment tabs, and the configuration that said annular abutment tabs adopt in relation to said insertion hole.

FIG. 9 is a view of the dowel head in which a clamp has been inserted, shown in section according to a plane including a diameter of the central core of the dowel body.

FIG. 10 is a sectional view of the dowel head, similar to the preceding figure but according to a plane perpendicular to the central core of the dowel body.

FIG. 11 is a sectional view along the line XI-XI in FIG. 1.

FIG. 12 is a sectional view along the line XII-XII in FIG. 1.

FIG. 13 is an enlarged detail of FIG. 2, rotated through 180 degrees, showing the configuration of the edges of the annular retention tabs and the annular abutment tabs, as well as the connection angles of said annular retention and abutment tabs with the central core of the dowel body.

FIG. 14 is a sectional view of a part of FIG. 13.

DETAILED DESCRIPTION OF THE EMBODIMENTS

FIGS. 1 to 4 show an embodiment of an improved dowel 1 according to the invention. The dowel is made up of a head 2 and a body 3 which, when the dowel is inserted into a hole 16 made beforehand in an inside wall, outside wall or facing 4, are arranged outside and inside insertion hole 16, respectively, as shown in FIG. 7.

Head 2 is shaped like a hollow parallelepiped 5 that has its middle faces 6 open and its larger outer face 7 extends along its larger sides in two quadrangular cantilever projections 8. From the other larger inner face 9 there emerges the central core 10 of the dowel, which is joined to said larger face 9 by a short frustoparabolic connection 11.

Central core 10 is substantially cylindrical and it is completed at its free end, opposite head 2, by at least one annular centring projection made up of a frustoconical body 12 axially aligned with said central core 10. In the embodiment shown, there are two frustoconical bodies 12 and they are joined axially by a cylindrical section 21 which can be cut to adjust the length of dowel 1. Said frustoconical bodies 12 include bracketed tabs 22, of which there are preferably four, which are included in a virtual cylindrical space having a diameter slightly larger than that of insertion hole 16.

From central core 10 there emerge, at an equal distance, a series of annular retention tabs 13 alternated with another series of annular abutment tabs 14.

As can be seen in FIGS. 5 to 8, 13 and 14, annular retention tabs 13 have a larger diameter than that of annular abutment tabs 14, the diameter of the latter being equal to the diameter of insertion hole 16 in inside wall 4.

Edge 17 of annular retention tabs 13 is bevelled through its full thickness, as illustrated in FIG. 13 which shows a detail of FIG. 2, whereby there is defined a smaller face 13A orientated towards head 2 of dowel 1 and a larger face 13B orientated towards the tail of said dowel. On the other hand, edge 18 of annular abutment tabs 14 has a blunt shape, at least in the half thereof facing the annular retention tab 13 with which it forms a pair.

In order to facilitate directing the dowel into insertion hole 16 (FIG. 6), the first 15 of said retention tabs 13, that is the one furthest away from dowel head 2, has a slightly different shape to the others: it has a smaller diameter, although it is larger than that of insertion hole 16, and its edge is bevelled in the opposite direction, in other words so that said first tab 15 has a larger annular face orientated towards dowel head 2 and a smaller annular face orientated towards the end opposite dowel head 2.

With reference to FIGS. 1, 4, 11 and 12, it is evident that annular retention tabs 13 and annular abutment 14 tabs next to head 2 of dowel 1 have two diametrically opposite partial notches 19, whereas in the rest of body 3 of dowel 1 annular retention tabs 13, 15 and annular abutment tabs 14 have complete notches 20 which reach central core 10.

Annular retention tabs 13, and also preferably annular abutment tabs 14, as can be seen in FIG. 13 and detailed in FIG. 14, connect to central core 10 of body 3 of dowel 1 according to a reduced radius arc r, on their smaller face 13A orientated towards dowel head 2, while on their larger face 13B orientated towards the tail of the dowel, they connect to central core 10 according a larger radius arc R.

Head 2 is hollow and defines a through hole 23 which opens in two windows made up of the open middle faces 6 and which is provided inside with two centring tongues 24 and a retention tongue 25, the former being intended to centre the position of a clamp 26 which is inserted into head 2 and the latter being intended to retain said clamp 26 by engaging its teeth 27.

The invention claimed is:

1. A dowel, to be inserted in a hole in a wall, comprising:
   a head to remain outside the hole, said head capable of receiving a clamp therethrough and absorbing a force to insert the dowel into the hole; and
   a body to remain inside the hole, said body including a central core from which emerges in an orthogonal direction a series of annular retention tabs having a slightly larger diameter than the hole and at least one annular centering projection located at an end of the central core opposite the head, said annular centering projection having a diameter that coincides with that of the hole and is intended to direct the dowel into the hole, said annular retention tabs having radial notches,
   wherein each of said annular retention tabs forms a pair with a similar annular abutment tab which is located, with respect to the annular retention tab with which it forms a pair, in a position nearest the head, said annular abutment tab having a diameter that is smaller than that of said annular retention tab and equal to that of the hole, and
   wherein differences in diameters and a distance between each annular retention tab and the annular abutment tab with which it forms a pair are such that said annular retention tab can flex and rest on said annular abutment tab and on a wall of the hole.

2. The dowel according to claim 1, wherein an edge of each annular retention tab is beveled through a full thickness thereof, so that a smaller face is orientated towards the head and a larger face is orientated towards an opposite tail of said dowel.

3. The dowel according to the claim 2, wherein the annular retention tabs, on the smaller face orientated towards the head, and the annular abutment tabs, on a face thereof orientated in the same way, connect to the central core according to a reduced radius arc (r), while on the larger face orientated towards the tail of the dowel, the annular retention tabs and the annular abutment tabs connect to the central core according to a greater radius (R) than said reduced radius (r).

4. The dowel according to claim 1, wherein an edge of each annular abutment tab is blunt, at least in a portion thereof facing the annular retention tab with which it forms a pair.

5. The dowel according to claim 1, wherein the annular retention tabs and annular abutment tabs that are located in an axial part of the body next to the head have partial radial notches, the bottoms of which are separated, the same distance, from the central core, while in a remainder of said body, the annular retention tabs and annular abutment tabs have complete radial notches which reach said central core.

6. The dowel according to claim 4, wherein said partial radial notches and said complete radial notches are aligned parallel to an axis of the central core.

7. The dowel according to claim 5, wherein each of said annular retention tabs and said annular abutment tabs has only two of said radial notches arranged in diametrically opposite positions with respect to the axis of the central core.

8. The dowel according to claim 1, wherein said annular centering projection includes at least one frustoconical body, arranged at a tail of the dowel opposite the head and as an axial continuation of the central core, which is coaxially joined to said central core by a larger base and which has bracketed tabs included on a virtual cylindrical surface that has a diameter slightly larger than that of said larger base of the frustoconical body, which has a diameter that coincides with that of the hole.

9. The dowel according to claim 8, wherein the tail of the dowel has two of said frustoconical bodies separated from each other by a section allowing the separation of the frustoconical body located nearest an end of the dowel opposite the head.

10. The dowel according to claim 1, wherein the dowel head includes a through hole which is orthonogonal to an axis of the central core and which has an elongated quadrangular section, two centering tongues and one retention tongue being arranged inside said through hole, all located transverse to said through hole, said centering tongues being located opposite to one another on opposite faces of said through hole and said retention tongue being arranged on the face of said through hole furthest away from the central core.

11. The dowel according to claim 1, wherein a first of said retention tabs furthest away from the head, has a diameter that is smaller than the diameter of the rest of said annular retention tabs and larger than the diameter of the hole.

12. The dowel according to claim 11, wherein said first annular retention tab has an edge beveled so that it defines a larger annular face orientated towards the dowel head and a smaller annular face orientated towards an end opposite the head.

13. A dowel, to be inserted in a hole in a wall, comprising:
a head to remain outside the hole, said head capable of receiving a clamp therethrough and absorbing a force to insert the dowel into the hole; and
a body to remain inside the hole, said body including a central core from which emerges in an orthogonal direction a series of annular retention tabs having a slightly larger diameter than the hole and at least one annular centering projection located at an end of the central core opposite the head, said annular centering projection having a diameter that coincides with that of the hole and is intended to direct the dowel into the hole, said annular retention tabs having radial notches,
wherein each of said annular retention tabs forms a pair with a similar annular abutment tab which is located, with respect to the annular retention tab with which it forms a pair, in a position nearest the head, said annular abutment tab having a diameter that is smaller than that of said annular retention tab and equal to that of the hole, and
wherein the annular retention tabs and annular abutment tabs that are located in an axial part of the body next to the head have partial radial notches, the bottoms of which are separated, the same distance, from the central core, while in a remainder of said body, the annular retention tabs and annular abutment tabs have complete radial notches which reach said central core.

14. The dowel according to claim 13, wherein said partial radial notches and said complete radial notches are aligned parallel to an axis of the central core.

15. The dowel according to claim 14, wherein each of said annular retention tabs and said annular abutment tabs has only two of said radial notches arranged in diametrically opposite positions with respect to the axis of the central core.

16. A dowel, to be inserted in a hole in a wall, comprising:
a head to remain outside the hole, said head capable of receiving a clamp therethrough and absorbing a force to insert the dowel into the hole; and
a body to remain inside the hole, said body including a central core from which emerges in an orthogonal direction a series of annular retention tabs having a slightly larger diameter than the hole and at least one annular centering projection located at an end of the central core opposite the head, said annular centering projection having a diameter that coincides with that of the hole and is intended to direct the dowel into the hole, said annular retention tabs having radial notches,
wherein each of said annular retention tabs forms a pair with a similar annular abutment tab which is located, with respect to the annular retention tab with which it forms a pair, in a position nearest the head, said annular abutment tab having a diameter that is smaller than that of said annular retention tab and equal to that of the hole,
wherein a first of said retention tabs furthest away from the head, has a diameter that is smaller than the diameter of the rest of said annular retention tabs and larger than the diameter of the hole, and
wherein said first annular retention tab has an edge beveled so that it defines a larger annular face orientated towards the dowel head and a smaller annular face orientated towards an end opposite the head.

* * * * *